(12) United States Patent
Liu

(10) Patent No.: US 9,180,748 B2
(45) Date of Patent: Nov. 10, 2015

(54) SUSPENSION CONTROL SYSTEM AND METHOD OF CONTROLLING SUSPENSION DEVICE

(71) Applicant: Yanqing Liu, Susono (JP)

(72) Inventor: Yanqing Liu, Susono (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 14/415,334

(22) PCT Filed: Oct. 18, 2013

(86) PCT No.: PCT/IB2013/002331
§ 371 (c)(1),
(2) Date: Jan. 16, 2015

(87) PCT Pub. No.: WO2014/064501
PCT Pub. Date: May 1, 2014

(65) Prior Publication Data
US 2015/0191067 A1    Jul. 9, 2015

(30) Foreign Application Priority Data
Oct. 23, 2012   (JP) ................................ 2012-234194

(51) Int. Cl.
*B60G 17/016*   (2006.01)
*B60G 13/04*    (2006.01)
*B60G 17/015*   (2006.01)

(52) U.S. Cl.
CPC .............. *B60G 17/016* (2013.01); *B60G 13/04* (2013.01); *B60G 17/0152* (2013.01); *B60G 2202/23* (2013.01); *B60G 2400/202* (2013.01); *B60G 2400/206* (2013.01); *B60G 2400/412* (2013.01); *B60G 2500/10* (2013.01)

(58) Field of Classification Search
CPC .. B60G 13/04; B60G 17/0152; B60G 17/016; B60G 2500/10; B60G 2400/202; B60G 2400/206; B60G 2400/412; B60G 2202/23
See application file for complete search history.

(56) References Cited

U.S. PATENT DOCUMENTS 4,589,676 A * 5/1986 Meloche et al. ............ 280/5.515

FOREIGN PATENT DOCUMENTS

| EP | 0 279 507 A2 | 8/1988 |
|----|--------------|--------|
| JP | 03-084447 U1 | 8/1991 |

(Continued)

OTHER PUBLICATIONS

Partial translation of Office Action issued on Feb. 3, 2014 in corresponding Japanese Patent Application No. 2012-234194.

*Primary Examiner* — Mary Cheung
*Assistant Examiner* — Yuen Wong
(74) *Attorney, Agent, or Firm* — Sughrue Mion, PLLC

(57) ABSTRACT

A suspension control system includes a suspension device (2) that connects a sprung member (5) and an unsprung member (6) of a vehicle, an actuator (3) operable to adjust frictional force along a stroke direction of the suspension device (2), and a control device (4) configured to control the actuator (3), based on a velocity direction of the sprung member (5) parallel to the stroke direction of the suspension device (2), and a stroke velocity direction of the suspension device (2), so as to adjust suspension frictional force as the frictional force along the stroke direction of the suspension device (2). The control device (4) is configured to adjust a magnitude of the suspension frictional force, so that it becomes substantially equal to a required frictional force determined based on a value obtained by exponentiating the velocity of the sprung member (5), and a value obtained by exponentiating the stroke velocity of the suspension device (2).

4 Claims, 8 Drawing Sheets

(56) References Cited

FOREIGN PATENT DOCUMENTS

| | | |
|---|---|---|
| JP | 06-179316 A | 6/1994 |
| JP | 06-227227 A | 8/1994 |
| JP | 06-344744 A | 12/1994 |
| JP | 10-141415 A | 5/1998 |
| JP | 2012-111393 A | 6/2012 |
| JP | 2014-043199 A | 3/2014 |
| WO | 2014/033519 A1 | 3/2014 |

* cited by examiner

FIG. 2

| | A | B | C | D |
|---|---|---|---|---|
| SPRUNG MASS VELOCITY | UPWARD + | UPWARD + | DOWNWARD − | DOWNWARD − |
| STROKE VELOCITY | CONTRACTING − | EXPANDING + | EXPANDING + | CONTRACTING − |
| FRICTIONAL FORCE DIRECTION | UP | DOWN | DOWN | UP |
| FRICTIONAL FORCE CONTROL | SMALL | LARGE | SMALL | LARGE |

SUSPENSION CONTROL SYSTEM AND METHOD OF CONTROLLING SUSPENSION DEVICE

BACKGROUND OF THE INVENTION

1. Field of the Invention

The invention relates to a suspension control system, and a method of controlling a suspension device.

2. Description of Related Art

As a known suspension control system installed on a vehicle, a hydraulic damper is described in, for example, Japanese Patent Application Publication No. 10-141415 (JP 10-141415 A). In the hydraulic damper, a piston that is in sliding contact with an inner circumferential surface of a cylinder is mounted on one end of a piston rod, and the other end of the piston rod is guided to extend to the outside, via a rod guide and an oil seal provided on the cylinder side. Also, in the hydraulic damper, a bushing is provided in a space between the rod guide and the oil seal, such that a certain friction arises between the bushing and the piston rod when the piston velocity is a very low velocity.

The hydraulic damper of the vehicle as described in JP 10-141415 A is constructed as described above in order to suppress minute vibration that occurs after large vibration occurs during running of the vehicle on a bad road; nonetheless, there is still room for further improvement in terms of suppression of vibration, for example.

SUMMARY OF THE INVENTION

The invention provides a suspension control system that is able to appropriately suppress vibration, and a method of controlling a suspension device.

A suspension control system according to a first aspect of the invention includes a suspension device that connects a sprung member of a vehicle with an unsprung member of the vehicle, an actuator operable to adjust frictional force along a stroke direction of the suspension device, and a control device configured to control the actuator, based on a velocity direction of the sprung member parallel to the stroke direction of the suspension device, and a stroke velocity direction of the suspension device, so as to adjust suspension frictional force as the frictional force along the stroke direction of the suspension device. The control device is configured to adjust a magnitude of the suspension frictional force, so that the suspension frictional force becomes substantially equal to a required frictional force determined based on a value obtained by exponentiating the velocity of the sprung member, and a value obtained by exponentiating the stroke velocity of the suspension device.

In the suspension control system as described above, an exponent of the value obtained by exponentiating the velocity of the sprung member may be larger than an exponent of the value obtained by exponentiating the stroke velocity of the suspension device.

In the suspension control system as described above, the control device may set the required frictional force, based on the velocity of the sprung member from which a predetermined high-frequency component is removed, and the stroke velocity of the suspension device from which a predetermined high-frequency component is removed.

In the suspension control system as described above, the control device may set the required frictional so that the required frictional force in the case where the velocity direction of the sprung member is the same as the stroke velocity direction of the suspension device become larger than the required frictional force in the case where the velocity direction of, the sprung member is different from the stroke velocity direction of the suspension device.

A method of controlling a suspension device that connects a sprung member of a vehicle with an unsprung member of the vehicle, according to a second aspect of the invention, includes adjusting suspension frictional force as frictional force along a stroke direction of the suspension device, based on a velocity direction of the sprung member parallel to the stroke direction of the suspension device, and a stroke velocity direction of the suspension device. When the suspension frictional force is adjusted, a magnitude of the suspension frictional force is adjusted so that the suspension frictional force becomes substantially equal to a required frictional force determined based on a value obtained by exponentiating the velocity of the sprung member, and a value obtained, by exponentiating the stroke velocity of the suspension device.

With the suspension control system and control method as described above, vibration can be appropriately suppressed.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 2 is a diagram useful for explaining the control logic of frictional force control performed by the suspension control system according to the embodiment;

DETAILED DESCRIPTION OF EMBODIMENTS

One embodiment of the invention will be described in detail with reference, to the drawings. It is, however, to be understood that this invention is not limited to this embodiment. Also, constituent elements of the following embodiment include those that can be easily replaced with the constituent elements by a person with ordinary skill in the art, or those that are substantially identical with the constituent elements.

Figure 1:
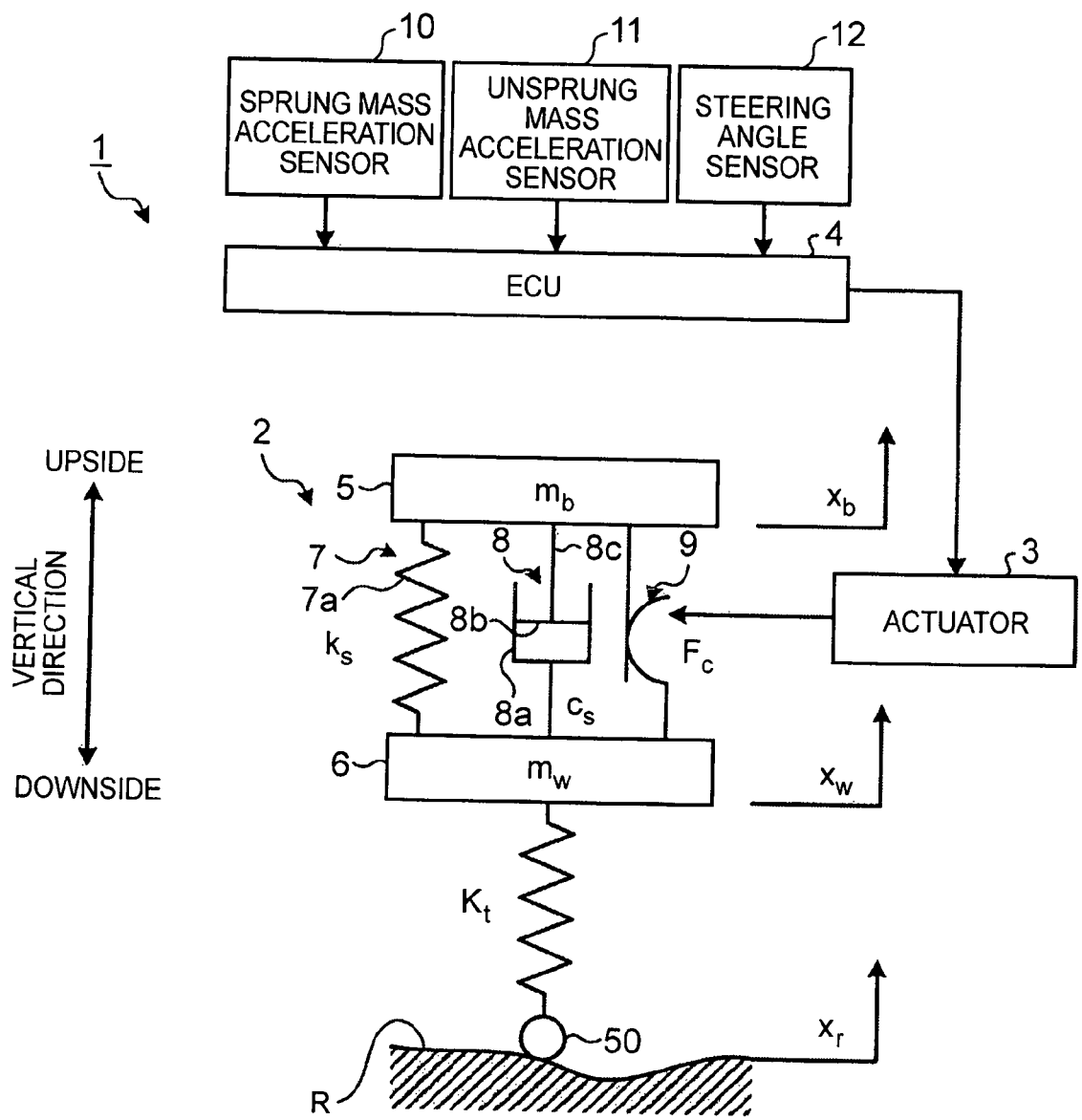
FIG. 1 is a schematic view showing the schematic configuration of a suspension control system according to one embodiment of the invention.
Figure 3:
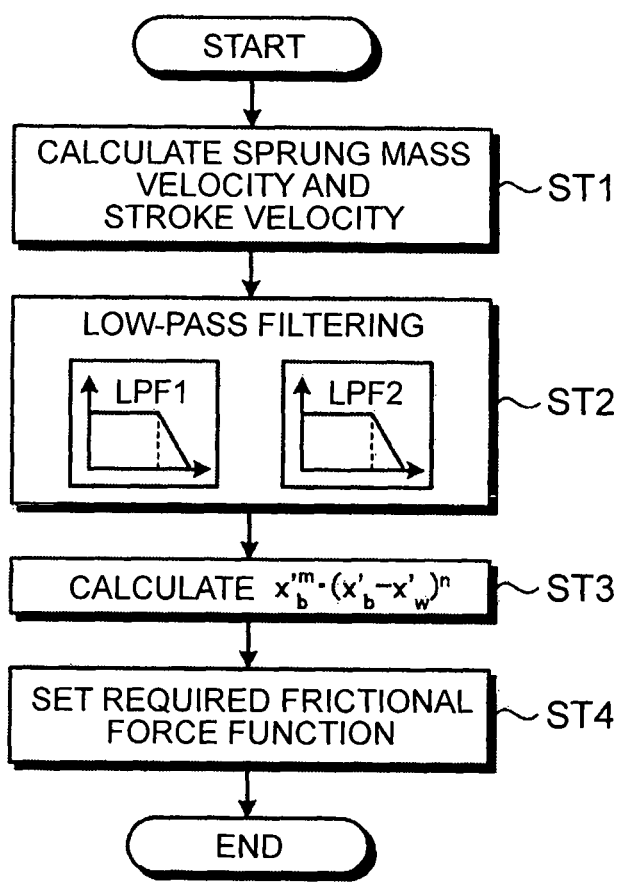
FIG. 3 is a flowchart illustrating one example of control for setting required frictional force, which control is performed by the suspension control system according to the embodiment.
Figure 4:
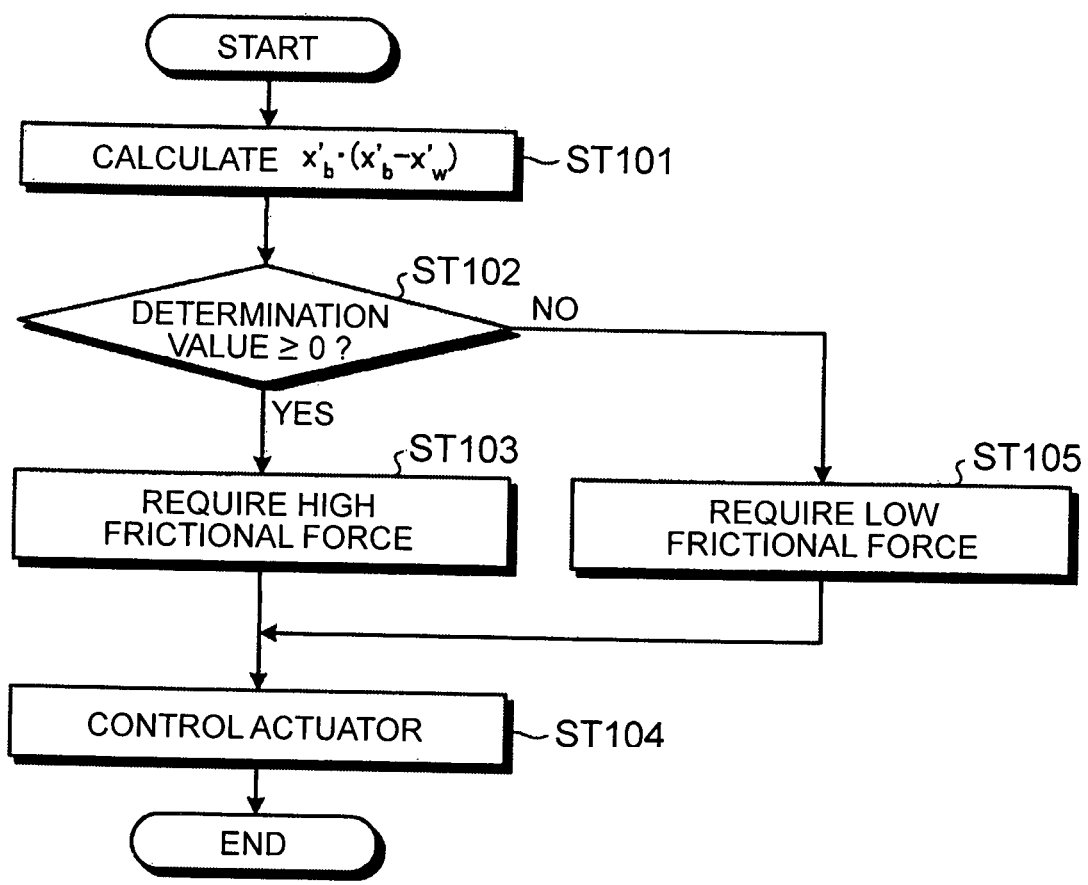
FIG. 4 is a flowchart illustrating one example of frictional force control performed by the suspension control system according to the embodiment.
Figure 5:
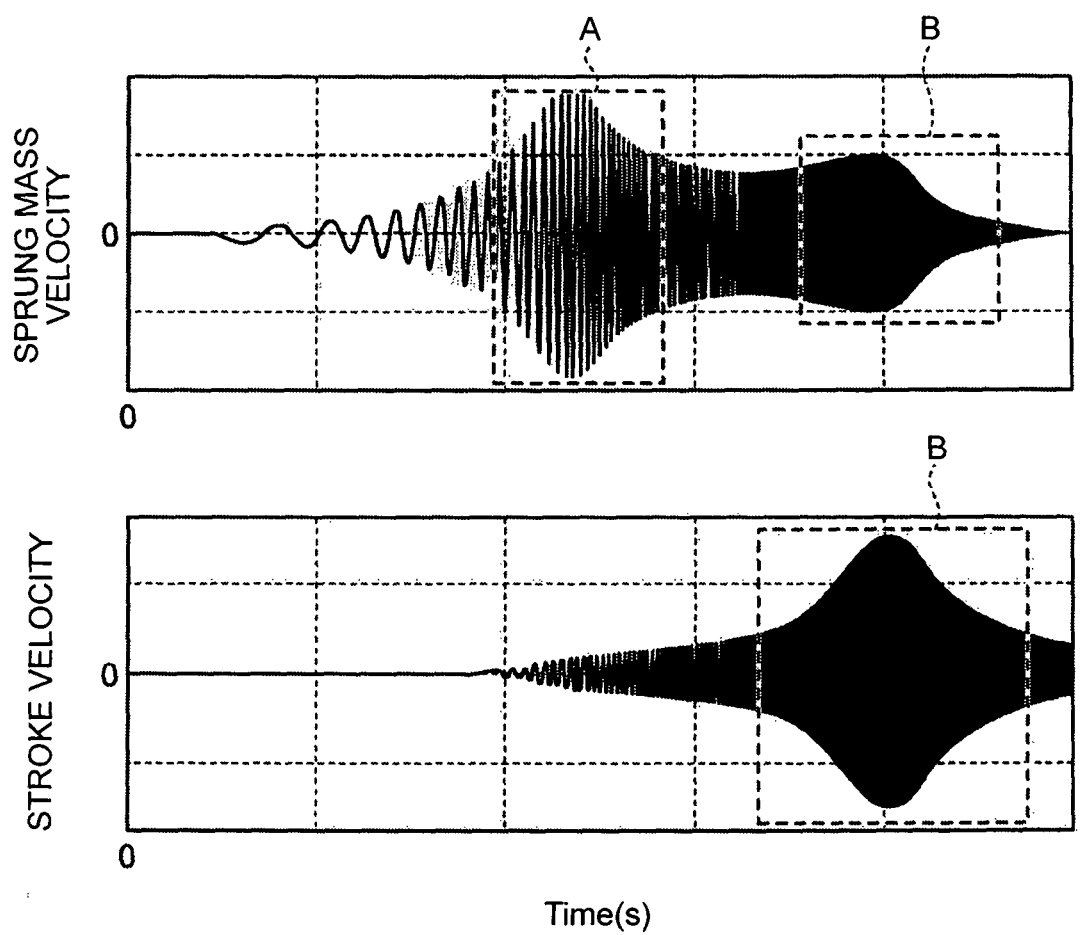
FIG. 5 is a graph showing one example of time responses of the sprung mass velocity and the stroke velocity.
Figure 6:
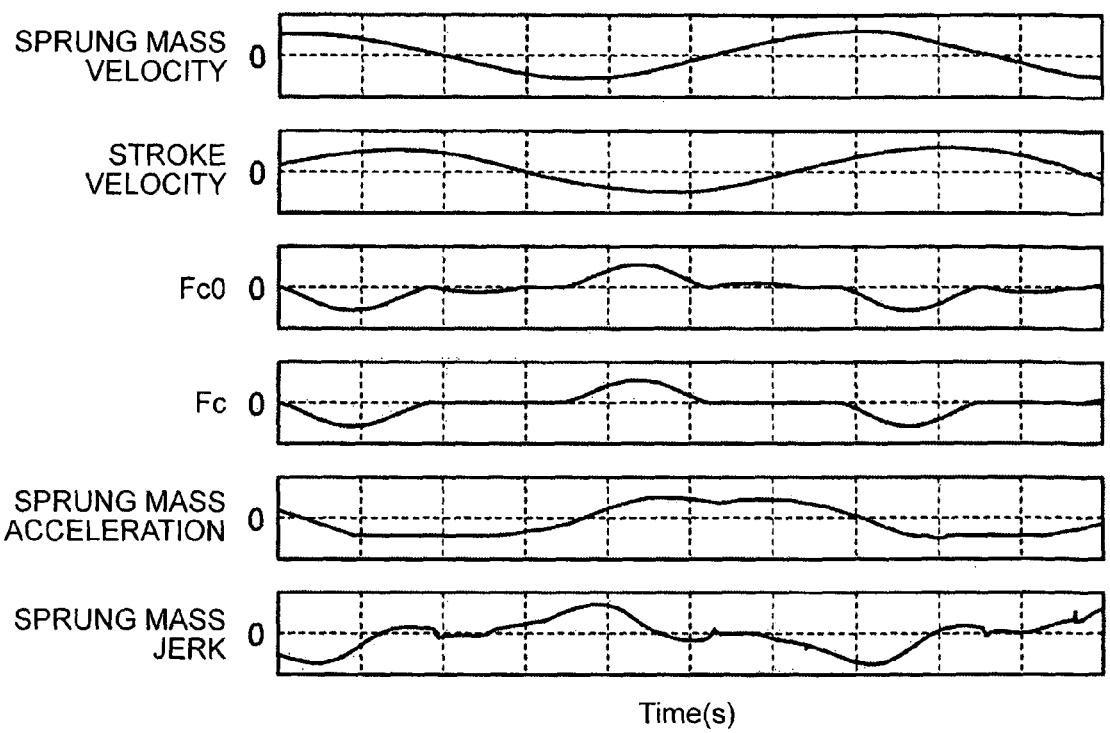
FIG. 6 is a graph showing one example of the operation of the suspension control system according to the embodiment.
Figure 7:
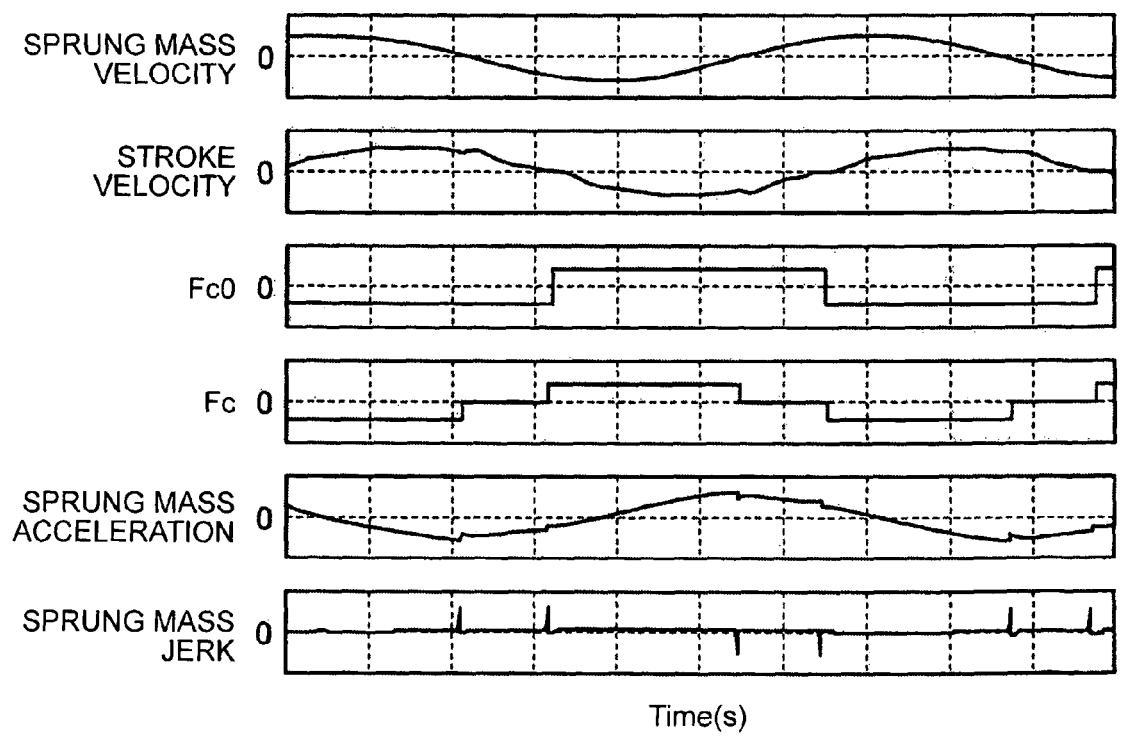
FIG. 7 is a graph showing one example of the operation of a suspension control system according to a comparative example.
Figure 8A:
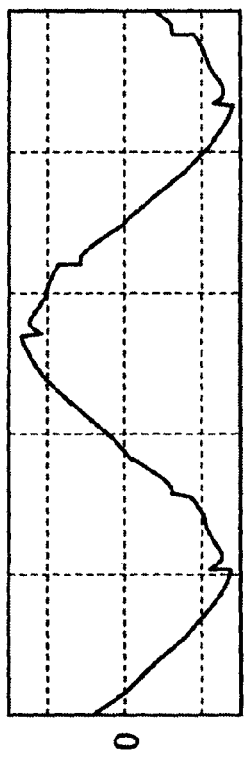
FIG. 8A-FIG. 8D are graphs useful for comparing one example of the operation of the suspension control system according to the embodiment with that of the suspension control system according to the comparative example.
Figure 8C:
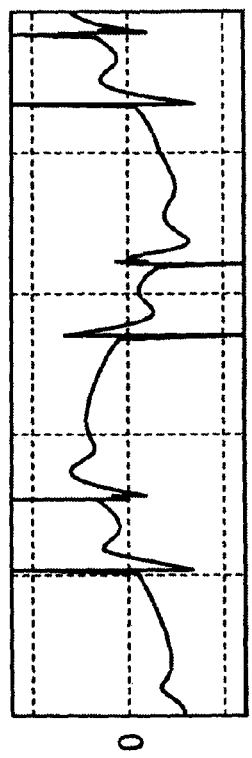
Figure 8B:
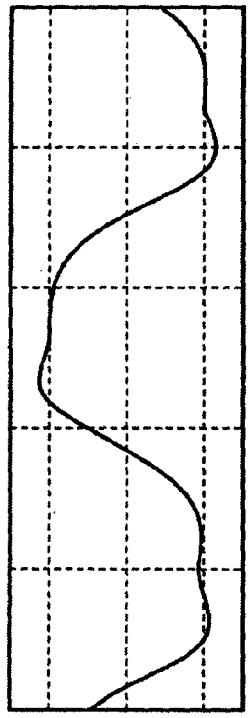
Figure 8D:
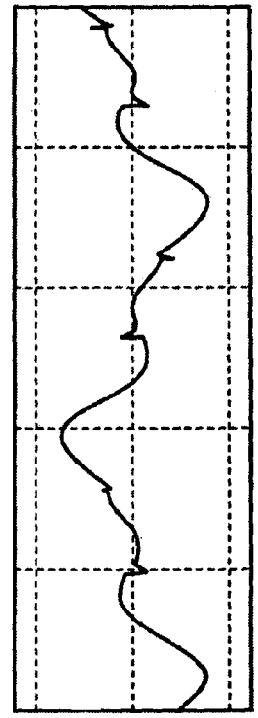
Figure 9:
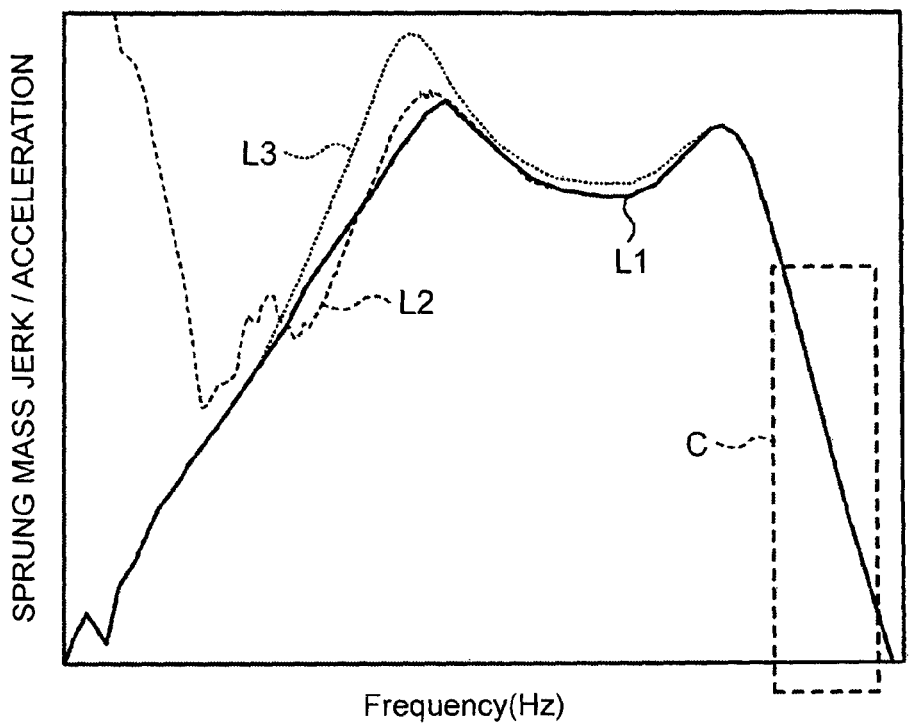
FIG. 9 is a graph showing one example of sprung mass vibration when frictional force control is performed by the suspension control system according to the embodiment.
Figure 10:
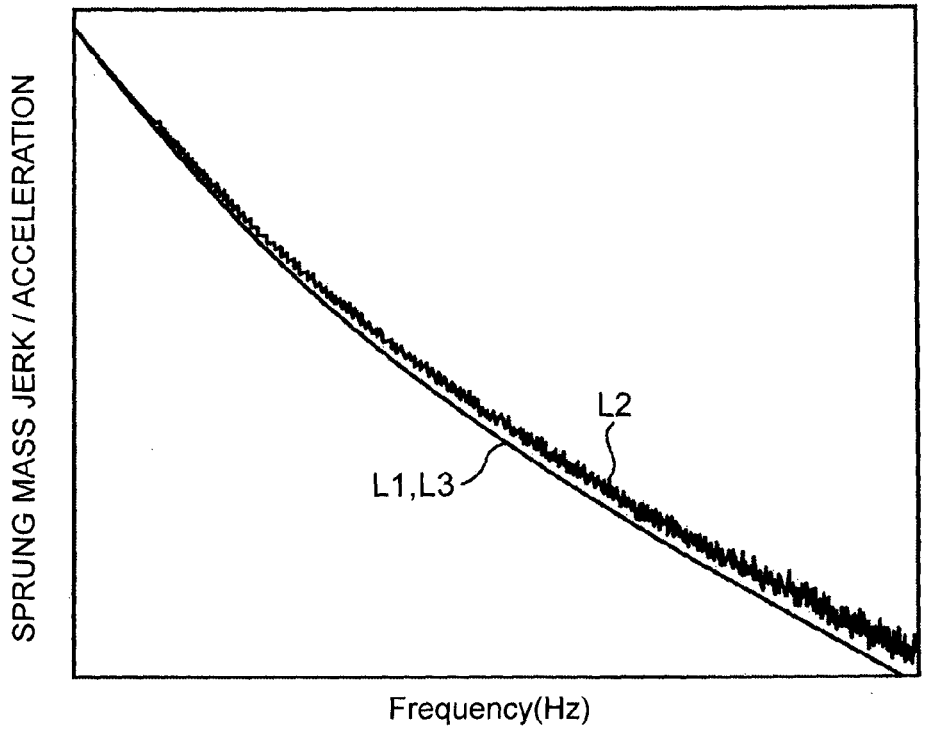
FIG. 10 is a graph showing one example of sprung mass vibration when frictional force control is performed by the suspension control system according to the embodiment.

FIG. 1 is a schematic view showing the schematic configuration of a suspension control system according to one embodiment of the invention, and FIG. 2 is a diagram useful for explaining the control logic of frictional force control performed by the suspension control system according to the embodiment. FIG. 3 is a flowchart illustrating one example of control for setting required frictional force, which control is performed by the suspension control system according to the embodiment. FIG. 4 is a flowchart illustrating one example of frictional force control performed by the suspension control system according to the embodiment. FIG. 5 is a graph showing one example of time responses of the sprung mass velocity and the stroke velocity. FIG. 6 is a graph showing one example of the operation of the suspension control system according to the embodiment. FIG. 7 is a graph showing one example of the operation of a suspension control system according to a comparative example. FIG. 8A-FIG. 8D are graphs, useful for comparing one example of the operation of the suspension control system according to the embodiment with that of the suspension control system according to the comparative example. FIG. 9 and FIG. 10 are graphs showing one example of sprung mass vibration when frictional force control is performed by the suspension control system according to the embodiment.

FIG. 1 represents a single-wheel model of a damping control system according to the embodiment of the invention. The single-wheel model shown in FIG. 1 is a kinetic model of a vehicle including a suspension device. In FIG. 1, "$c_s$" represents the damping coefficient of a damping mechanism 8 which will be described later. "$F_c$" represents the suspension frictional force generated in a sliding portion 9 which will be described later. "$k_s$" represents the modulus of elasticity of a spring mechanism 7 which will be described later. "$k_t$" represents the stiffness (spring constant) of a wheel 50. "$m_b$" represents the mass (which may be called "sprung mass") of a sprung member 5 which will be described later. "$m_w$" represents the mass (which may be called "unsprung mass") of an unsprung member 6 which will be described later. "$x_b$" represents the displacement (which may be called "sprung mass displacement") of the sprung member 5. "$x_w$" represents the displacement (which may be called "unsprung mass displacement") of the unsprung member 6. "$x_r$" represents the displacement (which may be called "road surface displacement") of a road surface R. Here, "displacement" is a displacement of an object relative to its reference position as measured in the up-and-down direction of the vehicle, for example, a displacement measured in the vertical direction. The amount of movement of the suspension device 2 in the axial direction as described later may also be referred to as "displacement".

In the suspension control system 1 according to this embodiment as shown in FIG. 1, the suspension device 2, which corresponds to each of four wheels 50 of the vehicle, is provided for supporting the wheel 50 on the vehicle body of the vehicle. The suspension control system 1 includes the suspension device 2, actuator 3, and an ECU 4 as a control device. In the suspension control system 1, one suspension device 2 and one actuator 3 are provided for each of the four wheels 50, and one ECU 4 is provided for the four wheels 50 (i.e., the four wheels 50 share a common ECU 4). In the following, the suspension device 2 and the actuator 3 for one of the four wheels 50 will be explained.

The suspension device 2 is provided between the sprung member 5 and unsprung member 6 of the vehicle, for connecting the sprung member 5 with the unsprung member 6. The sprung member 5 is a member supported by the suspension device 2, and includes the vehicle body. The unsprung member 6 is a member located closer to the wheel 50 than the suspension device 2, and includes a knuckle coupled to the wheel 50, a lower arm coupled to the knuckle, and so forth.

The suspension device 2 has a spring mechanism 7, and a damping mechanism 8. The spring mechanism 7 and the damping mechanism 8 are arranged in parallel with each other.

The spring mechanism 7 connects the sprung member 5 with the unsprung member 6, and produces spring force commensurate with a relative displacement between the sprung member 5 and the unsprung member 6, so as to apply the spring force to the sprung member 5 and the unsprung member 6. The spring mechanism 7 produces the spring force, by means of a coil spring 7a mounted on a piston rod 8c of the damping mechanism 8 which will be described later, or an air suspension mechanism (not shown), for example. The relative displacement between the sprung member 5 and the unsprung member 6 is a relative displacement in a direction in which the sprung member 5 and the unsprung member 6 come closer to each other or get away from each other in the stroke direction of the suspension device 2 (which may be called "suspension stroke direction"). While the suspension stroke direction is illustrated herein as a direction parallel to the vertical direction, the suspension stroke direction may be inclined by a given angle from the vertical direction. The spring mechanism 7 may be constructed such that its elastic modulus $k_s$, or spring force, can be variably controlled.

The damping mechanism 8 connects the sprung member 5 with the unsprung member 6, and produces damping force for damping or attenuating relative movement between the sprung member 5 and the unsprung member 6. The relative movement between the sprung member 5 and the unsprung member 6 takes place in a direction in which the sprung member 5 and the unsprung member 6 come closer to each other or get away from each other in the suspension stroke direction. The damping mechanism 8 produces damping force commensurate with the relative velocity between the sprung member 5 and the unsprung member 6 during the relative movement, so as to damp or attenuate the relative movement. For example, a shock absorber is used as the damping mechanism 8. The shock absorber may include, for example, a cylinder 8a that is connected to one of the sprung member 5 and the unsprung member 6 and contains a working fluid, and a piston rod 8c connected to the other of the sprung member 5 and the unsprung member 6. The piston rod 8c has a piston portion 81b that reciprocates within the cylinder 8a. In the suspension device 2, the cylinder 8a and the piston rod 8c move relative to each other to make strokes, for relative displacement between the sprung member 5 and the unsprung member 6. In other words, the suspension stroke direction is a direction in which the cylinder 8a and the piston rod 8c move relative to each other, typically, a direction in which the sprung member 5 and the unsprung member 6 move relative to each other. The damping mechanism 8 may be constructed such that its damping coefficient $c_s$, or damping force, can be variably controlled. In this case, a shock absorber whose damping coefficient $c_s$ can be variably controlled may be used as the damping mechanism 8. As a mechanism that variably controls the damping coefficient $c_s$, a device operable to rotate a rotary valve of the piston portion 8b so as to vary the flow passage area of an oil passage that communicates an upper chamber of the piston with a lower chamber thereof may be employed. It is, however, to be understood that the damping mechanism 8 is not limited to this arrangement, but a damping mechanism constructed otherwise may be used, or the damping mechanism 8 may be constructed such that its damping coefficient $c_s$ cannot be variably controlled.

The actuator 3 is able to adjust frictional force (which may be called "suspension frictional force") generated along the stroke direction of the suspension device 2.

Here, the suspension frictional force $F_c$ is frictional force that acts on the sliding portion 9 of the suspension device 2. The sliding portion 9 of the suspension device 2 is a portion of the suspension device 2 which slides in accordance with strokes thereof, and may include, for example, a sliding region between the piston rod 8c and cylinder 8a of the damping mechanism 8 (shock absorber), a sliding region of a seal member provided between the piston rod 8c and the cylinder 8a, and so forth. Namely, the suspension frictional force $F_c$ is frictional force generated along the stroke direction in the sliding portion 9 in accordance with strokes of the suspension device 2.

The actuator 3 is arranged to be able to variably control (change) the suspension frictional force $F_c$ generated in the sliding portion 9. For example, various devices, such as a device that can vary the fastening force of the seal member that provides the sliding portion 9, by means of a piezoelectric element, or the like, and a device that can vary the force with which one of the piston rod 8c and the cylinder 8a is pressed against the other, may be used. It is, however, to be understood that the actuator 3 is not limited to the above arrangements, but may be constructed otherwise so as to be able to adjust the suspension frictional force $F_c$.

The ECU 4 controls the actuator 3, so as to adjust the suspension frictional force $F_c$. In this embodiment, the ECU 4 is configured to control each portion of the vehicle on which the suspension control system 1 is installed. The ECU 4 is an electronic control unit that consists principally of a known microcomputer including CPU, ROM, RAM, and an interface. For example, various sensors, such as a sprung mass acceleration sensor 10 as a sprung mass acceleration detector, an unsprung mass acceleration sensor 11 as an unsprung mass acceleration detector, and a steering angle sensor 12 as a steering angle detector, and each portion of the vehicle on which the suspension control system 1 is installed, are electrically connected to the ECU 4. The sprung mass acceleration sensor 10 is placed on the sprung member 5. The sprung mass acceleration sensor 10 is operable to detect the acceleration (which may be called "sprung mass acceleration") of the sprung member 5 in the suspension stroke direction, typically, in the vertical direction of the sprung member 5. The unsprung mass acceleration sensor 11 is placed on the unsprung member 6. The unsprung mass acceleration sensor 11 is operable to detect the acceleration (which may be called "unsprung mass acceleration") of the unsprung member 6 in the suspension stroke direction, typically, in the vertical direction of the unsprung member 6. The steering angle sensor 12 detects the steering angle of the vehicle on which the suspension, control system 1 is installed, more specifically, the steering angle of the steering wheel as the amount of operation of the steering wheel. The ECU 4 receives electric signals (detection signals) corresponding to the detection results from various sensors, and outputs drive signals to respective portions of the vehicle on which the suspension control system 1 is installed, according to the received detection results, so as to control driving thereof.

Here, the force generated by the damping mechanism (shock absorber) 8 will be described, with regard to the case where the stroke velocity of the suspension device 2 is within a very low velocity region where the stroke velocity is very low, such as when the vehicle runs on a good road where the road surface R has a relatively small number of irregularities. The stroke velocity of the suspension device 2 corresponds to the velocity of expansion and contraction of the suspension device 2 (the velocity of relative displacement between, the cylinder 8a and the piston rod 8c). The very low velocity region is a velocity region in which an absolute value of the stroke velocity is larger than 0 m/s and smaller than 0.002 m/s. As one example, the force (total axial force) generated by the damping mechanism 8 when vibration having a very small amplitude of about 0.2 mm is applied at a frequency of about 1.5 Hz (when the stroke velocity is a very low velocity less than 0.002 m/s) will be described.

As the suspension device 2 vibrates in the vertical direction, friction occurs to the sliding portion 9. When the stroke velocity is within a very low velocity region, the force generated by the damping mechanism 8 of the suspension device 2 constructed as described above consists mainly of coulomb friction force that provides the suspension frictional force $F_c$, and elastic (viscoelastic) friction force, and is hardly influenced by the very-low-velocity damping force of the damping mechanism 8. Here, the coulomb friction force is typically static friction force that appears in the sliding portion 9, and the elastic (viscoelastic) friction force is typically dynamic friction force that appears in the seal member, or the like, of the sliding portion 9 at the start of strokes.

In the suspension control system 1, it was found that, in the very low velocity region of the stroke velocity as described above, there is incompatibility as described below, regarding the ride performance or ride quality depending on the relationship between the frequency of the road surface input (i.e., vibration) applied to the suspension device 2 and the suspension frictional force $F_c$. Namely, if the suspension control system 1 sets the suspension frictional force $F_c$ that appears in the sliding portion 9 to relatively small frictional force, in an attempt to improve the ride performance against the road surface input of a middle frequency region (which may be called "middle-frequency vibration") applied to the suspension device 2, the ride performance against the road surface input of a low frequency region (which may be called "low-frequency vibration") deteriorates, and tends to give a "floaty" feeling to a passenger. On the other hand, if the suspension control system 1 sets the suspension frictional force $F_c$ that appears in the sliding portion 9 to relatively large frictional force, in an attempt to improve the ride performance against the low-frequency vibration, for example, the ride performance against the middle-frequency vibration deteriorates, and tends to give a "rough" feeling to a passenger. Therefore, it may not be possible to make the ride performance against the low-frequency vibration compatible with the ride performance against the middle-frequency vibration, simply by making the suspension frictional force $F_c$ relatively large, or making the suspension frictional force $F_c$ relatively small. The above-indicated low-frequency region is, for example, a region that is higher than 0 Hz and lower than 1.5 Hz. On the other hand, the middle-frequency region is, for example, a region that is equal to or higher than 1.5 Hz and equal to or lower than 8 Hz.

Thus, in the suspension control system 1 of this embodiment, the ECU 4 performs frictional force control by controlling the actuator 3 according to conditions of the suspension device 2, and adjusting the suspension frictional force $F_c$, so as to make the ride performance against the low-frequency vibration compatible with the ride performance against the middle-frequency vibration, and appropriately suppress sprung mass vibrations.

More specifically, the ECU 4 performs frictional force control by controlling the actuator 3 and adjusting the suspension frictional force $F_c$, based on the velocity direction of the sprung member 5 (which may be called "sprung mass velocity direction") parallel to the suspension stroke direction, and the stroke velocity direction of the suspension device 2. In this manner, the ECU 4 changes friction characteristics of the damping mechanism (shock absorber) 8 according to the conditions of the suspension device 2.

Here, the sprung mass velocity direction is the direction of a velocity vector of the sprung member 5, which is, typically, the upward vertical direction (+(positive)), or downward vertical direction ((negative)). The stroke velocity direction is the direction of a stroke velocity (velocity of expansion and contraction) vector of the suspension device 2, which is, typically, the upward vertical direction (expanding direction, +(positive)), or downward vertical direction (contracting direction, −(negative)).

The ECU 4 of this embodiment performs frictional force control, for example, when the vehicle travels straight on a good road where the stroke velocity is within a very low velocity region. In this embodiment, the ECU 4 performs frictional force control when the stroke velocity of the suspension device 2 is within a very low velocity region that is equal to or lower than a predetermined velocity set in advance, and the steering angle of the vehicle is equal to or smaller than a predetermined angle set in advance. With the frictional force control thus performed, the ECU 4 improves the vehicle performance when the stroke velocity is within the very low velocity region.

The ECU 4 may calculate the stroke velocity of the suspension device 2 in the following manner, for example. In the following explanation, "x'" represents first order differential, and "x''" represents second order differential. The ECU 4 calculates the sprung mass velocity $x_b'$ by integrating the sprung mass acceleration $x_b''$ detected by the sprung mass acceleration sensor 10. Also, the ECU 4 calculates the unsprung mass velocity $x_w'$ by integrating the unsprung mass acceleration $x_w''$ detected by the unsprung mass acceleration sensor 11. Then, the ECU 4 calculates a difference between the sprung mass velocity $x_b'$ and the unsprung mass velocity $x_w'$, namely, the relative velocity ($x_b'-x_w'$) between the sprung member 5 and the unsprung member 6, based on the calculated sprung mass velocity $x_b'$ and unsprung mass velocity $x_w'$, and sets the relative velocity ($x_b'-x_w'$) as the stroke velocity (expansion/contraction velocity) of the suspension device 2. The ECU 4 may calculate the stroke velocity in another manner, for example, by differentiating the stroke displacement (the amount of expansion or contraction) of the suspension device 2, based, on the detection result of a sensor that detects the stroke displacement of the suspension device 2. Also, the ECU 4 may obtain the steering angle of the vehicle, based on the steering angle of the steering wheel detected by the steering angle sensor 12. Further, the above-indicated predetermined velocity is set in advance, according to stroke characteristics, etc. of the suspension device 2, based on on-vehicle evaluation, for example. The predetermined velocity is set to a velocity at which the stroke velocity can be determined as being within a very low velocity region, typically, set to a velocity, such as about 0.015 m/s, which is higher than 0 m/s and lower than 0.002 m/s. Also, the predetermined angle is set in advance, according to straight-ahead running performance of the vehicle, steering characteristics, etc., based on on-vehicle evaluation, for example. The predetermined angle is set to an angle at which it can be determined that the vehicle is running straight ahead, and is set to, for example, about ±5 degrees.

It was found that when the suspension device 2 as described above is subjected to low-frequency vibration (first-frequency vibration), the sprung mass velocity direction tends to be the same as the stroke velocity direction, since the vibration is applied with a relatively long period. On the other hand, when the suspension device 2 is subjected to middle-frequency vibration (second-frequency vibration) having a higher frequency than the low-frequency vibration, the sprung mass velocity direction tends to be different from the stroke velocity direction, since the vibration is applied with a relatively short period.

In view of the above finding, the ECU 4 controls the actuator 3 for control of frictional force, so that the suspension frictional force $F_c$ in the case where the sprung mass velocity direction is the same as the stroke velocity direction becomes larger than the suspension frictional force $F_c$ in the case where the sprung mass velocity direction is different from (opposite to) the stroke velocity direction. Namely, the ECU 4 makes the suspension frictional force $F_c$ relatively large when the sprung mass velocity direction is the same as the stroke velocity direction, in other words, when low-frequency vibration is presumed to be applied to the suspension device 2. On the other hand, the ECU 4 makes the suspension frictional force $F_c$ relatively small when the sprung mass velocity direction is different from the stroke velocity direction, in other words, when middle-frequency vibration is presumed to be applied to the suspension device 2.

In this embodiment, an on-off control logic as shown in FIG. 2 is designed for appropriately suppressing sprung mass vibration, and the ECU 4 performs frictional force control based on the on-off control logic. FIG. 2 schematically illustrates the suspension device 2, without illustrating the unsprung member 6, etc.

The ECU 4 makes the suspension frictional force $F_c$ relatively large when the relationship between the velocity directions is that in a condition (B) or a condition (D) where the ride performance is required to be improved against low-frequency vibration, namely, when the sprung mass velocity direction is the same as the stroke velocity direction. In this case, in the condition (B) where the sprung mass velocity direction is the upward direction (+), and the stroke velocity direction is the expanding direction (+), the ECU 4 controls the actuator 3, so as to apply relatively large suspension frictional force $F_c$ downward as indicated by a black arrow in FIG. 2. In the condition (D) where the sprung mass velocity direction is the downward direction (−), and the stroke velocity direction is the contracting direction (−), the ECU 4 controls the actuator 3, so as to apply relatively large suspension frictional force $F_c$ upward as indicated by a black arrow in FIG. 2.

On the other hand, the ECU 4 makes the suspension frictional force $F_c$ relatively small when the relationship between the velocity directions is that in a condition (A) or a condition (C) where the ride performance is required to be improved against middle-frequency vibration, namely, when the sprung mass velocity direction is different from (opposite to) the stroke velocity direction. In this case, in the condition (A) where the sprung mass velocity direction is the upward direction (+), and the stroke velocity direction is the contracting direction (−), the ECU 4 controls the actuator 3, so as to apply relatively small suspension frictional force $F_c$ upward as indicated by a black arrow in FIG. 2. In the condition (C) where the sprung mass velocity direction is the downward direction (−), and the stroke velocity direction is the expanding direction (+), the ECU 4 controls the actuator 3, so as to apply relatively small suspension frictional force $F_c$ downward as indicated by a black arrow in FIG. 2.

Then, the ECU 4 of this embodiment adjusts the magnitude of the suspension frictional force $F_c$, so that it becomes substantially equal to the required frictional force determined based on a value obtained by exponentiating the sprung mass velocity (i.e., a power of the sprung mass velocity) and a value obtained by exponentiating the stroke velocity (i.e., a power of the stroke velocity). In this manner, the suspension control system 1 prevents the sprung mass acceleration and the sprung mass jerk from largely changing at the moment that the suspension friction force $F_c$ is switched (changes non-continuously) between the time when low-frequency vibration is applied and the time when middle-frequency vibration is applied, so as to curb occurrence of shock and abnormal noise, and more appropriately suppress vibration.

The above-mentioned required frictional force is frictional force required to be produced by the actuator 3, under the frictional force control for adjusting the suspension frictional force $F_c$ by controlling the actuator 3. The ECU 4 controls the actuator 3 based on the required frictional force so that the suspension frictional force $F_c$ approaches and becomes equal to the required frictional force.

Typically, taking account of the discontinuity of the frictional force when the suspension frictional force $F_c$ is switched between the time when lower-frequency vibration is applied and the time when middle-frequency vibration is applied, the ECU 4 sets the required frictional force so that the actually produced suspension frictional force $F_c$ changes continuously. For example, the ECU 4 makes it possible to produce continuous suspension frictional force $F_c$ by feeding back the state quantities of the system, and determining the required frictional force of the suspension frictional force $F_c$ as a function of the state quantities of the system. Also, the ECU 4 defines control conditions using a function, for example, so that the suspension frictional force $F_c$ continuously changes from zero at the moment of switching of the suspension frictional force $F_c$.

More specifically, the ECU 4 sets the required frictional force using a combination of the sprung mass velocity and the stroke velocity. The ECU 4 sets the required frictional force, based on a power of the sprung mass velocity and a power of the stroke velocity. Namely, in this embodiment, the required frictional force is a function of an m-th power of the sprung mass velocity and an n-th power of the stroke velocity.

For example, the maximum value $f_{cmax}$ and minimum value $f_{cmin}$ of the frictional force control value for use in the frictional force control may be expressed by Eq. (1) and Eq. (2) as indicated below. The maximum value $f_{cmax}$ of the frictional force control value is the maximum value of the absolute value of the suspension frictional force $F_c$ produced under the frictional force control. The minimum value $f_{cmin}$ of the frictional force control value is the minimum value of the absolute value of the suspension frictional force $F_c$ produced under the frictional force control. In Eq. (1) and Eq. (2) below, "Ca" and "Cb" are coefficients that are respectively arbitrarily determined, and the coefficient Ca is set to be larger than the coefficient "Cb" (Ca>Cb). The ECU 4 can adjust the maximum value $f_{cmax}$ of the frictional force control value and the minimum value $f_{cmin}$ of the frictional force control value to desired magnitudes (values), by adjusting the coefficient "Ca" and the coefficient "Cb". As one example, the ECU 4 sets the coefficients Ca, Cb such that Ca=20×10 and Cb=0, in Eq. (1) and Eq. (2). In these equations, "m" is an exponent of the power of the sprung velocity, and "n" is an exponent of the power of the stroke velocity. These exponents "m", "n" are natural numbers (m≥1, n≥1).

$$f_{cmax} = Ca \cdot x_b'^m \cdot (x_b' - x_w')^n \qquad (1)$$

$$f_{cmin} = Cb \cdot x_b'^m \cdot (x_b' - x_w')^n \qquad (2)$$

In this embodiment, the ECU 4 calculates the product of the sprung mass velocity $x_b'$ and the stroke velocity $(x_b'-x_w')$, for example, and sets the product as a frictional force selection determination value (which will be called "determination value" when appropriate). Also, the ECU 4 selects high frictional force or low frictional force, depending on whether the determination value is equal to or larger than a threshold value, which is "0" in this embodiment. The ECU 4 sets a frictional force control value $F_{ccon}$, based on the determination value $x_b' \cdot (x_b'-x_w')$ as the product of the sprung mass velocity $x_b'$ and the stroke velocity $(x_b'-x_w')$, using Eq. (3-1) and Eq. (3-2) as indicated below, for example. The frictional force control value $F_{ccon}$ is a control value used when the actuator 3 is controlled so as to control the suspension frictional force $F_{ccon}$, and corresponds to the above-mentioned required frictional force. In Eq. (3-1) and Eq. (3-2) below, the sign of the frictional force control value $F_{ccon}$, or the direction of the frictional force, is determined according to the relationship in magnitude between the sprung mass velocity $x_b'$ and the unsprung mass velocity $x_w'$. In Eq. (3-1) and Eq. (3-2) below, a portion of Eq. (3-1) including and following the coefficient Ca, and a portion of Eq. (3-2) including and following the coefficient Cb, correspond to the required frictional force function in this embodiment.

$$F_{ccon} = Ca \cdot x_b'^m \cdot (x_b'-x_w')^n \cdot \text{sgn}(x_b'-x_w') = f_{cmax} \cdot \text{sgn}(x_b'-x_w') \quad x_b' \cdot (x_b'-x_w') \geq 0 \qquad (3\text{-}1)$$

$$F_{ccon} = Ca \cdot x_b'^m \cdot (x_b'-x_w')^n \cdot \text{sgn}(x_b'-x_w') = f_{cmin} \cdot \text{sgn}(x_b'-x_w') \quad x_b' \cdot (x_b'-x_w') < 0 \qquad (3\text{-}1)$$

When the determination value $x_b' \cdot (x_b'-x_w')$ is a positive value $(x_b' \cdot (x_b'-x_w') \geq 0)$, it means that the direction of the sprung mass velocity is the same as the direction of the stroke velocity. Thus, when the determination value $x_b' \cdot (x_b'-x_w')$ is a positive value, the ECU 4 sets the frictional force control value (required frictional force) $F_{ccon}$ to a relatively large value, based on a control condition (control logic) as indicated in Eq. (3-1) above. Namely, in this case, the ECU 4 sets the frictional force control value $F_{ccon}$ to a value corresponding to the above-indicated maximum value $f_{cmax}$ of the frictional force control value, for example. On the other hand, when the determination value $x_b' \cdot (x_b'-x_w')$ is a negative value $(x_b' \cdot (x_b'-x_w') < 0)$, it means that the direction of the sprung mass velocity is different from the direction of the stroke velocity. Thus, when the determination value $x_b' \cdot (x_b'-x_w')$ is a negative value $(x_b' \cdot (x_b'-x_w') < 0)$, the ECU 4 sets the frictional force control value $F_{ccon}$ to a relatively small value, based on a control condition (control logic) as indicated in Eq. (3-2) above. Namely, in this case, the ECU 4 sets the frictional force control value $F_{ccon}$ to a value corresponding to the above-indicated minimum value $f_{cmin}$ of the frictional force control value, for example.

Namely, the ECU 4 sets the frictional force control value (required frictional force) $F_{ccon}$ according to Eq. (3-1) and Eq. (3-2), so as to make the required frictional force in the case where the direction of the sprung mass velocity is the same as the direction of the stroke velocity larger than the required friction force in the case where the direction of the sprung mass velocity is different from the direction of the stroke velocity. At this time, the ECU 4 sets the required frictional force, based on the value obtained by exponentiating the sprung mass velocity and the value obtained by exponentiating the stroke velocity.

Then, the ECU 4 controls the actuator 3, and actually adjusts the suspension frictional force $F_c$, based on the frictional force control value (required frictional force) $F_{ccon}$ set as described above. Thus, when the direction of the sprung mass velocity is the same as the direction of the stroke velocity, and the ride performance is required to be improved against low-frequency vibration, the ECU 4 sets the frictional force control value $F_{ccon}$ to the value corresponding to the maximum value $f_{cmax}$ of the frictional force control value, and controls the actuator 3 based on the control value $F_{ccon}$, so that relatively large suspension frictional force $F_c$ can be actually applied to the sliding portion 9. On the other hand, when the direction of the sprung mass velocity is different from the direction of the stroke velocity, and the ride performance is required to be improved against middle-frequency vibration, the ECU 4 sets the frictional force control value $F_{ccon}$ to the value corresponding to the minimum value $f_{cmin}$ of the frictional force control value, and controls the actuator 3 based on the control value $F_{ccon}$, so that relatively small suspension frictional force $F_c$ can be actually applied to the sliding portion 9.

Accordingly, the suspension control system 1 performs frictional force control, more specifically, controls the actuator 3 according to the conditions of the suspension device 2 for adjustment of the suspension frictional force $F_c$, so that sprung mass vibration can be suppressed when low-frequency vibration is applied to the suspension device 2, and sprung mass vibration can also be suppressed with balance when middle-frequency vibration is applied to the suspension device 2. Namely, the suspension control system 1 can make the frictional force along the stroke direction relatively large when the low-frequency performance is required to be improved, more specifically, when the sprung mass velocity direction is the same as the stroke velocity direction. Also, the suspension control system 1 can make the frictional force along the stroke direction relatively small when the middle-frequency performance is required to be improved, more specifically, when the sprung mass velocity direction is different from the stroke velocity direction. Consequently, the suspension control system 1 can suppress both the "floaty" feeling caused by the low-frequency vibration, and the "rough" feeling caused by the middle-frequency vibration, so as to make the ride performance against the low-frequency vibration compatible with the ride performance against the middle-frequency vibration. Namely, the low-frequency performance and middle-frequency performance of the vehicle, which could be otherwise incompatible with each other, can be appropriately made compatible with each other, so that the sprung mass vibration can be appropriately suppressed.

At this time, the suspension control system 1 sets the frictional force control value (required frictional force) $F_{ccon}$ based on a value obtained by exponentiating the sprung mass velocity (i.e., a power of the sprung mass velocity), and a value obtained by exponentiating the stroke velocity (i.e., a power of the stroke velocity), and adjusts the magnitude of the suspension frictional force $F_c$ based on the control value $F_{ccon}$. As a result, the suspension control system 1 can provide the required frictional force with continuity when it switches the frictional force control value $F_{ccon}$ so as to switch the suspension frictional force $F_c$ actually applied to the sliding portion 9, between the time when low-frequency vibration is applied and the time when middle-frequency vibration is applied as described above. Therefore, the suspension control system 1 can prevent the sprung mass acceleration and sprung mass jerk from suddenly changing at the time of switching of control. Namely, the amount of increase of the suspension frictional force $F_c$, or amount of reduction of the suspension frictional force $F_c$, at the moment of switching of the suspension frictional force $F_c$, is made relatively small; therefore, the suspension control system 1 can prevent the sprung mass acceleration and sprung mass jerk from changing largely at the time of switching of the frictional force control value $F_{ccon}$.

In Eq. (1) through Eq. (3-2) as indicated above, it is preferable that the exponent "m" of the power of the sprung mass velocity is larger than the exponent "n" of the power of the stroke velocity. Namely, the ECU 4 preferably sets the exponent "m" of the power of the sprung velocity and the exponent "n" of the power of the stroke velocity, in Eq. (1) through Eq. (3-2), so as to satisfy a condition that m>n. The ECU 4 sets the frictional force control value (required frictional force) $F_{ccon}$ while making the exponent "m" of the power of the sprung mass velocity larger than the exponent "n" of the power of the stroke velocity. As one example, the ECU 4 sets the exponents so that m=2 and n=1, in Eq. (1) through Eq. (3-2). By using a relatively high-order value for exponentiating the sprung mass velocity, and using a relatively low-order value for exponentiating the stroke velocity, the suspension control system 1 can make the required frictional force in a sprung mass resonance region (e.g., around a low frequency of 1 Hz) relatively large. Consequently, the suspension control system 1 can further improve the vibration suppression performance in a low-frequency region in the vicinity of the sprung mass resonance region.

When the ECU 4 sets the frictional force control value (required frictional force) $F_{ccon}$ as described above, it is preferable to set the frictional force control value $F_{ccon}$, based on the sprung mass velocity from which a predetermined high-frequency component is removed, and the stroke velocity from which a predetermined high-frequency component is removed. In this embodiment, the ECU 4 performs low-pass filtering using a low-pass filter, on a signal indicative of the sprung mass velocity and a signal indicative of the stroke velocity. The low-pass filter permits only a portion of each signal having a lower band of frequencies than a predetermined cut-off frequency (set frequency), to pass therethrough. Then, the ECU 4 calculates the frictional force control value $F_{ccon}$, based on the signal indicative of the sprung mass velocity, which signal has been subjected to the low-pass filtering, and the signal indicative of the stroke velocity, which signal has been subjected to the low-pass filtering. In this case, the predetermined cut-off frequency used in the low-pass filtering is set to 1.5 Hz, for example. In other words, the above-mentioned high-frequency component is set to a frequency region equal to or higher than 1.5 Hz, for example. In this manner, the suspension control system 1 can make the required frictional force in a higher frequency region (e.g., around 10-40 Hz) than the sprung mass resonance region relatively small. Consequently, the suspension control system 1 can further improve the vibration suppression performance in the high-frequency region and its vicinity.

Next, one example of control for setting required frictional force and one example of frictional force control, which are performed by the ECU 4, will be described with reference to the flowcharts of FIG. 3 and FIG. 4. These control routines are repeatedly executed in control cycles of several milliseconds to several tens of milliseconds.

In this example, the ECU 4 performs frictional force control as will be explained below, in the case where the stroke velocity is within a very low velocity region in which the stroke velocity is equal to or lower than a predetermined velocity, and the steering angle of the vehicle is equal to or smaller than a predetermined angle. Thus, the suspension control system 1 can limit the timing of execution of the frictional force control to the time when the vehicle is travelling straight on a good road, in other words, when both of the ride performance against low-frequency vibration and the ride performance against middle-frequency vibration are required to be improved. In other cases, the frictional force may be fixed. Therefore, the suspension control system 1 can more efficiently suppress sprung mass vibration. It is, however, to be understood that the invention is not limited to this arrangement, but the ECU 4 may perform frictional force control in cases other than the case where the vehicle is travelling straight on a good road. Namely, the ECU 4 may perform frictional force control in cases other than the case where the stroke velocity of the suspension device 2 is within the very low velocity region in which the stroke velocity is equal to or lower than the predetermined velocity, and the steering angle of the vehicle is equal to or smaller than the predetermined angle.

Initially, the control for setting the required frictional force will be described with reference to FIG. 3.

The ECU 4 calculates the sprung mass velocity $x_b'$ and the stroke velocity $(x_b'-x_w')$ (step ST1). For example, the ECU 4 integrates the sprung mass acceleration $x_b''$, based on the result of detection by the sprung mass acceleration sensor 10, and calculates the sprung mass velocity $x_b'$, based on the result of integration of the sprung mass acceleration $x_b''$. Also, the ECU 4 integrates the unsprung mass acceleration $x_w''$ to calculate the unsprung mass velocity $x_w'$, based on the result of detection by the unsprung mass acceleration sensor 11, for example, and calculates the stroke velocity $(x_b'-x_w')$, based on the sprung mass velocity $x_b'$ calculated above and the unsprung mass velocity $x_w'$. The ECU 4 may calculate the stroke velocity by differentiating a stroke displacement of the suspension device 2, based on the result of detection by a sensor that detects the stroke displacement.

Then, the ECU 4 performs low-pass filtering on the sprung mass velocity $x_b'$ calculated in step ST1, and the stroke velocity $(x_b'-x_w')$ calculated in step ST1 (step ST2). For example, the ECU 4 performs low-pass filtering on the sprung mass velocity $x_b'$, using a low-pass filter LPF1 that permits only a lower band of frequencies than the predetermined cut-off frequency to pass therethrough. Similarly, the ECU 4 performs low-pass filtering on the stroke velocity $(x_b'-x_w')$, using a low-pass filter LPF2 that permits only a lower band of frequencies than the predetermined cut-off frequency to pass therethrough.

Then, the ECU 4 calculates the product of the m-th power of the sprung mass velocity $x_b'$ on which low-pass filtering was performed in step ST2, and the n-th power of the stroke velocity $(x_b'-x_w')$ on which low-pass filtering was similarly performed (step ST3). At this time, the ECU 4 sets the exponent "m" of the power of the sprung mass velocity and the exponent "n" of the power of the stroke velocity, so as to satisfy the condition that m>n.

Then, the ECU 4 sets the required frictional force function according to the above-indicated Eq. (3-1) and Eq. (3-2), based on the product of the m-th power of the sprung mass velocity $x_b'$ and the n-th power of the stroke velocity $(x_b'-x_w)$ calculated in step ST3 (step ST4). Then, the ECU 4 finishes the current control cycle, and proceeds to the next control cycle. When the ECU 4 calculates the stroke velocity by differentiating the stroke displacement in step ST1, the ECU 4 may set the function of the required frictional force, by providing the function with the sign corresponding to the stroke direction, based on, a given sign function.

Next, the frictional force control will be described with reference to FIG. 4.

The ECU 4 calculates the product of the sprung mass velocity $x_b'$ and the stroke velocity $(x_b'-x_w')$, and sets the product as the determination value $x_b' \cdot (x_b'-x_w')$ (step ST101). For example, the ECU 4 may calculate the product, using the sprung mass velocity $x_b'$ calculated in step ST1 of FIG. 3 and the stroke velocity $(x_b'-x_w')$ calculated in step ST1 of FIG. 3, or may calculate the product, by newly calculating the sprung mass velocity $x_b'$ and the stroke velocity $(x_b'-x_w')$.

Then, the ECU 4 determines whether the determination value $x_b' \cdot (x_b'-x_w')$ calculated in step ST101 is equal to or larger than 0 (threshold value) (step ST102).

If the ECU 4 determines that the determination value $x_b' \cdot (x_b'-x_w')$ is equal to or larger than 0 (step ST102: YES), the ECU 4 requires high frictional force, based on Eq. (3-1) using the required frictional force function set in step ST4 of FIG. 3. Then, the ECU 4 sets the frictional force control value (required frictional force) $F_{ccon}$ to a value corresponding to the maximum value $f_{cmax}$ of the frictional force control value (step ST103).

Then, the ECU 4 controls the actuator 3, based on the frictional force control value $F_{ccon}$ (in this cycle, the value corresponding to the maximum value $f_{cmax}$ of the frictional force control value) set in step ST103, so as to make the suspension frictional force $F_c$ actually applied to the sliding portion 9 relatively large (step ST104). Then, the ECU 4 finishes the current control cycle, and proceeds to the next control cycle.

On the other hand, if the ECU 4 determines that the determination value $x_b' \cdot (x_b'-x_w')$ calculated in step ST101 is smaller than 0 (step ST102: NO), the ECU 4 requires low frictional force, based on Eq. (3-2) using the required frictional force function set in step ST4 of FIG. 3. Then, the ECU 4 sets the frictional force control value (required frictional force) $F_{ccon}$ to a value corresponding to the minimum value $f_{cmin}$ of the frictional force control value (step ST105).

Then, the ECU 4 controls the actuator 3, based on the frictional force control value $F_{ccon}$ (in this cycle, the value corresponding to the minimum value $f_{cmin}$ of the frictional force control value) set in step ST105, so as to make the suspension frictional force $F_c$ actually applied to the sliding portion 9 relatively small (step ST104). Then, the ECU 4 finishes the current control cycle, and proceeds to the next control cycle.

FIG. 5 is a graph showing one example of time responses of the sprung mass velocity and the stroke velocity in the vehicle on which the suspension control system 1 configured as described above, is installed. In FIG. 5, the horizontal axis indicates time, and the vertical axes indicate the sprung mass velocity and the stroke velocity. The ECU 4 makes the exponent "m" of the power of the sprung mass velocity larger than the exponent "n" of the power of the stroke velocity, and sets the frictional force control value (required frictional force) $F_{ccon}$, so that the suspension control system 1 can make the required frictional force relatively large, in a sprung mass resonance region as indicated by a surrounding line A in FIG. 5. Further, the ECU 4 sets the frictional force control value $F_{ccon}$ based on the sprung mass velocity from which a predetermined high-frequency component has been removed, and the stroke velocity from which a predetermined high-frequency component has been removed, so that the suspension control system 1 can make the required frictional force relatively small, in a high-frequency region as indicated by surrounding lines B in FIG. 5.

FIG. 6 is a graph showing one example of operating simulation of the suspension control system 1 configured as described above. FIG. 7 is a graph showing one example of operating simulation of a suspension control system according to a comparative example. In FIG. 6 and FIG. 7, the horizontal axis indicates time, and the vertical axes indicate the sprung mass velocity, stroke velocity, suspension frictional force $F_c0$, suspension frictional force $F_c$, sprung mass acceleration, and the sprung mass jerk. FIG. 6 and FIG. 7 show one example of simulation results where the stroke velocity ($x_b'-x_w'$) is in a very low region around 0.015 m/s. The suspension control system 1 of this embodiment shown in FIG. 6 is configured such that Ca=20×10, Cb=0, m=2, and n=1, in Eq. (1) through Eq. (3-2). The suspension control system according to the comparative example shown in FIG. 7 is configured such that $f_{cmax}$=20N, and $f_{cmin}$=0, without using the value obtained by exponentiating the sprung mass velocity and the value obtained by exponentiating the stroke velocity. The suspension frictional force $F_c0$ corresponds to $f_{cmax} \cdot sgn(x_b'-x_w')$, and the suspension frictional force $F_c$ corresponds to suspension frictional force actually produced according to the friction force control value (required frictional force) $F_{ccon}$ Obtained using Eq. (3-1) and Eq. (3-2). FIG. 8A and FIG. 8C are laterally arranged diagrams in which the sprung mass acceleration is plotted on lattices having the same unit intervals, and FIG. 8B and FIG. 8D are laterally arranged diagrams in which the sprung mass jerk is plotted on lattices having the same unit intervals, for the sake of easiness to compare the suspension control system. 1 according to this embodiment with the suspension control system according to the comparative example. FIG. 8A indicates the sprung mass acceleration of the suspension control system 1 according to this embodiment, and FIG. 8B indicates the sprung mass jerk of the suspension control system 1 according to this embodiment, while FIG. 8C indicates the sprung mass acceleration of the suspension control system according to the comparative example, and FIG. 8D indicates the sprung mass jerk of the suspension control system according to the comparative example.

As is apparent from comparisons among FIG. 6, FIG. 7, and FIGS. 8A-8D, when the suspension control system 1, of this embodiment switches the frictional force control value $F_{ccon}$ between the time when low-frequency vibration is applied and the time when middle-frequency vibration is applied, so as to switch the suspension frictional force $F_c$ actually applied to the sliding portion 9, the sprung mass acceleration and the sprung mass jerk are less likely to suddenly or abruptly change, as compared with the suspension control system according to the comparative example. Thus, when the suspension control system 1 of this embodiment switches the suspension frictional force $F_c$, the sprung mass acceleration changes substantially continuously, and peaks of the sprung mass jerk are significantly reduced, as compared with those of the suspension control system according to the comparative example.

FIG. 9 and FIG. 10 are graphs each showing one example of sprung mass vibration when the suspension control system 1 configured as described above performs frictional force control. In FIG. 9 and FIG. 10, the horizontal axis indicates the frequency of the vibration applied, and the vertical axis indicates the sprung mass jerk/acceleration. FIG. 9 and FIG. 10 represent one example of simulation results like those as described above. FIG. 10 is an enlarged view of a region defined by a surrounding line C in FIG. 9. In FIG. 9 and FIG. 10, line L1 represents the sprung mass jerk/acceleration when the above-described frictional force control is performed in the suspension control system 1 of this embodiment, and line L2 represents the sprung mass jerk/acceleration when the above-described frictional force control is performed in the suspension control system of the comparative example as described above. Line L3 represents the sprung mass jerk/acceleration when the suspension frictional force $F_c$ is fixed to a relatively small value (e.g., $F_c$=0N) in a suspension control system according to another comparative example.

The suspension control system 1 of this embodiment performs frictional force control by controlling the actuator 3 according to the conditions of the suspension device 2, based on the required frictional force that depends on a value obtained by exponentiating the sprung mass velocity and a value obtained by exponentiating the stroke velocity, so as to adjust the suspension frictional force $F_c$. Therefore, as is apparent from line L1 in FIG. 9 and FIG. 10, as compared with line L2 and line L3, the suspension control system 1 of this embodiment is able to suppress sprung mass vibrations with balance over almost all frequency regions.

The suspension control system 1 according to the embodiment as described above includes the suspension device 2, actuator 3, and the ECU 4. The suspension device 2 connects the sprung member 5 and unsprung member 6 of the vehicle. The actuator 3 is able to adjust the frictional force along the stroke direction of the suspension device 2. The ECU 4 controls the actuator 3, based on the velocity direction of the sprung member 5 parallel to the stroke direction of the suspension device 2, and the stroke velocity direction of the suspension device 2, so as to adjust the frictional force along the stroke direction of the suspension device 2. Furthermore, the ECU 4 adjusts the magnitude of the frictional force so that it becomes substantially equal to the required frictional force determined based on the value obtained by exponentiating the velocity of the sprung member 5, and the value obtained by exponentiating the stroke velocity of the suspension device 2.

Accordingly, the suspension control system 1 can make the frictional force along the stroke direction relatively large when the low-frequency performance is required to be improved, more specifically, when the sprung mass velocity direction is the same as the stroke velocity direction. Also, the suspension control system 1 can make the frictional force along the stroke direction relatively small when the middle-frequency performance is required to be improved, more specifically, when the sprung mass velocity direction is different from the stroke velocity direction. Consequently, the suspension control system 1 can make the ride performance against the low-frequency vibration compatible with the ride performance against the middle-frequency vibration, so that the low-frequency performance and middle-frequency performance of the vehicle, which could be otherwise incompatible with each other, can be appropriately made compatible with each other. At this time, the suspension control system 1 adjusts the frictional force along the stroke direction, based on the required frictional force that depends on the value obtained by exponentiating the sprung mass velocity, and the value obtained by exponentiating the stroke velocity, so as to prevent the sprung mass acceleration and the sprung mass jerk from largely changing at the time of switching of the frictional force. Consequently, the suspension control system 1 is able to curb occurrence of shock and abnormal noise, and more appropriately suppress vibrations.

The suspension control system according to the invention is not limited to the above-described embodiment, but various changes or modifications may be made within the ranges as described in the appended claims.

While the ECU 4 also serves as the control device in the illustrated embodiment, the invention is not limited to this arrangement. For example, the control device may be configured, separately from the ECU 4, to supply and receive information, such as detection signals, drive signals, and control commands, to and from the ECU 4.

The invention claimed is:

1. A suspension control system comprising:
a suspension device that connects a sprung member of a vehicle with an unsprung member of the vehicle;

an actuator that adjusts frictional force along a stroke direction of the suspension device; and an electronic control unit configured to control the actuator, based on a velocity direction of the sprung member parallel to a stroke direction of the suspension device, and a stroke velocity direction of the suspension device, so as to adjust a suspension frictional force that is the frictional force along the stroke direction of the suspension device, the electronic control unit being configured to adjust a magnitude of the suspension frictional force, so that the suspension frictional force becomes substantially equal to a required frictional force determined based on a value obtained by exponentiating the velocity of the sprung member, and another value obtained by exponentiating a stroke velocity of the suspension device, wherein:

an exponent of the value obtained by exponentiating the velocity of the sprung member is larger than an exponent of the another value obtained by exponentiating the stroke velocity of the suspension device; and the exponent of the value obtained by exponentiating the velocity of the sprung member and the exponent of the another value obtained by exponentiating the stroke velocity of the suspension device are natural numbers, each of the value and the another value being larger than or equal to 1.

2. The suspension control system according to claim 1, wherein the electronic control unit sets the required frictional force, based on the velocity of the sprung member from which a predetermined high-frequency component is removed, and the stroke velocity of the suspension device from which a predetermined high-frequency component is removed.

3. The suspension control system according to claim 1, wherein the electronic control unit sets the required frictional force so that the required frictional force in a case where the velocity direction of the sprung member is the same as the stroke velocity direction of the suspension device becomes larger than the required frictional force in another case where the velocity direction of the sprung member is different from the stroke velocity direction of the suspension device.

4. A method of controlling a suspension device that connects a sprung member of a vehicle with an unsprung member of the vehicle, comprising:

adjusting, by a processor, suspension frictional force that is the suspension frictional force along a stroke direction of the suspension device, based on a velocity direction of the sprung member parallel to the stroke direction of the suspension device, and a stroke velocity direction of the suspension device; and determining, by the processor, a magnitude of the suspension frictional force so that the suspension frictional force becomes substantially equal to a required frictional force determined based on a value obtained by exponentiating the velocity of the sprung member, and another value obtained by exponentiating the stroke velocity of the suspension device, wherein an exponent of the value obtained by exponentiating the velocity of the sprung member is larger than an exponent of the another value obtained by exponentiating the stroke velocity of the suspension device; and the exponent of the value obtained by exponentiating the velocity of the sprung member and the exponent of the another value obtained by exponentiating the stroke velocity of the suspension device are natural numbers, each of the value and the another value being larger than or equal to 1.

\* \* \* \* \*